(12) United States Patent
Selkirk

(10) Patent No.: US 7,938,361 B2
(45) Date of Patent: May 10, 2011

(54) JET BLAST WALL STRUCTURES

(75) Inventor: Mark Selkirk, Etobicoke (CA)

(73) Assignee: Blastwell Ltd., Toronto (CA)

( * ) Notice: Subject to any disclaimer, the term of this patent is extended or adjusted under 35 U.S.C. 154(b) by 0 days.

(21) Appl. No.: 11/551,256

(22) Filed: Oct. 20, 2006

(65) Prior Publication Data

US 2007/0113503 A1    May 24, 2007

Related U.S. Application Data

(60) Provisional application No. 60/596,967, filed on Nov. 1, 2005.

(51) Int. Cl.
*B64F 1/26* (2006.01)
(52) U.S. Cl. .............. 244/114 B; 244/114 R; 181/210; 411/2; 411/390
(58) Field of Classification Search .............. 244/114 B, 244/114 R; 52/396.01, 784.11, 782.1, 713; 114/261; 411/2, 3, 5, 390, 424, 908
See application file for complete search history.

(56) References Cited

U.S. PATENT DOCUMENTS

| | | | | |
|---|---|---|---|---|
| 2,075,773 A | * | 3/1937 | Vass | 52/592.1 |
| 2,826,382 A | * | 3/1958 | Hayden | 181/210 |
| 2,974,910 A | * | 3/1961 | Stanley | 244/114 B |
| 3,307,809 A | * | 3/1967 | Stanley | 244/114 R |
| 3,797,787 A | * | 3/1974 | Watanabe | 244/114 B |
| 4,471,924 A | * | 9/1984 | Lynn | 244/114 B |
| 4,717,286 A | * | 1/1988 | Loer | 405/74 |
| 5,127,609 A | * | 7/1992 | Lynn | 244/114 B |
| 5,299,397 A | * | 4/1994 | Ahern | 52/98 |
| 5,429,324 A | * | 7/1995 | Lynn | 244/114 B |
| 5,856,640 A | * | 1/1999 | Lynn | 181/218 |
| 6,802,477 B2 | | 10/2004 | Campion | |
| 2005/0271479 A1 | * | 12/2005 | Irvine | 405/284 |

OTHER PUBLICATIONS

"Pearson Airport's Innovative Fence Protection System (http://blastwall.com/articles.shtml) Orignally Published in "Doing Business with Public Works and Government Services.

* cited by examiner

*Primary Examiner* — Tien Dinh
*Assistant Examiner* — Philip J Bonzell
(74) *Attorney, Agent, or Firm* — Gerald A. Gowan; Gowan Intellectual Property

(57) ABSTRACT

A jet blast wall structure is provided which is adapted to withstand and deflect high temperature jet blasts from the jet engines of aircraft. The structure comprises a plurality of panels, each of which has a front panel face and edge frame members at each side of the front panel face to which the front panel face is secured. All components, including each front panel face is made substantially of fiberglass, and each edge frame member and each bolt or nut, used for production of the structure is also made from fiberglass. The structure is designed to have a predetermined shear strength, whereby in the event of impact of an aircraft with the jet blast wall structure, the bolts in the edge frame members of the impacted panel or panels will fail in shear so as to permit the impacted panel or panels to collapse and thereby so as preclude significant damage to the impacting aircraft. Further, by being made substantially of fiberglass, the blast wall structures of the present invention exhibit transparency to radar and radio frequency signals such as those which will be found at airports and from the aircraft arriving at and departing from such airports.

5 Claims, 2 Drawing Sheets

JET BLAST WALL STRUCTURES

RELATED APPLICATIONS

This application claims the benefit of priority under 35 U.S.C. §119(e) to U.S. Provisional Application Ser. No. 60/596,967 filed on Nov. 1, 2005, the entirety of which is hereby incorporated by reference.

FIELD OF THE INVENTION

This invention relates to blast wall structures, and particularly to blast wall structures which are intended for installation in airports where significant jet aircraft traffic occurs.

Specifically, the blast wall structures of the present invention are designed so as to exhibit transparency to radar and radio frequency signals such as those which will be found at airports and from the aircraft arriving at and departing from such airports. At the same time, the jet blast wall structures of the present invention are designed so as to withstand high temperature jet blasts particularly from departing aircraft, and are capable of precluding significant damage to an aircraft in the event of impact of the aircraft with the jet blast wall structure. This is accomplished because the blast wall structures of the present invention will fail in shear at the edges of the panels which comprise the blast wall structure, at predetermined shear strengths of the bolts which secure adjacent panels one to the other.

BACKGROUND OF THE INVENTION

Hitherto, jet blast walls that have been installed in airports have been made of steel. Such blast wall structures exhibit significant strength so as to withstand jet blasts from departing jet aircraft, particularly as they run up the engines at the end of the runway just prior to departure. However, steel blast wall structures have a number of drawbacks, including the fact that they must be continually maintained such as by cleaning and painting, they are specifically subject to corrosion and therefore have a relatively short finite life, and because they are made of steel they exhibit conductive and magnetic characteristics which may be unacceptable to radio and/or radar installations at the airport or signals from approaching or departing aircraft.

This latter drawback may mean the placement of a jet blast wall structure in inconvenient or inappropriate location; or it may mean that radio and/or radar installations, particularly such as antennae arrays, radio beacon installations, radio frequency localizer installations, and the like, may have to be placed at locations that are less efficient and/or more difficult to access.

Still further, in the unlikely event of impact of an aircraft with a steel jet blast wall structure, significant damage may occur to the nose cone, wingtip, or other part of the impacting aircraft.

Yet another drawback of steel jet blast wall structures is the requirement for the use of cranes or the like during their installation and/or repair. The presence of cranes on or near airport runways may require that the runway be shut down to aircraft traffic, and that in turn may be a major inconvenience to the airport operator as well as to the airlines which operate jet aircraft into and out of the airport.

These disadvantages are overcome or precluded by the installation of fiberglass jet blast wall structures in keeping with the present invention. These jet blast wall structures exhibit transparency to radar and radio frequency signals; and while they are relatively lightweight they will withstand jet blasts of departing aircraft. At the same time, jet blast wall structures of the present invention are relatively maintenance free, low cost, and long lasting, so that the capital budgets of airports may be set lower.

Typically, jet blast wall structures in keeping with the present invention are made from fiberglass, in all respects. That is, the major front panel face members of the jet blast wall structure, as well as all of the framing members, and even the nuts and bolts which secure the structure together, are all made from fiberglass. The precise method of fabrication of such panels and framing members, as well as of the nuts and bolts, is well-known to those skilled in the art. However, it is worth noting that the major components are typically either pultruded or molded.

Of course, as is well known to those familiar with fiberglass structures, the placement of such structures outdoors requires the presence of pigment and UV stabilizers incorporated into the resin; and by doing so, the structures are substantially corrosion resistant and maintenance free. It also follows, of course, that by constructing jet blast wall structures in keeping with the present invention substantially entirely from fiberglass, there are no metal parts, and therefore no radio or radar frequency interferences of any sort.

Moreover, the fiberglass jet blast wall structures in keeping with present invention are capable of withstanding jet take off blasts and high winds. In particular, a blast of 160 km/h may be deflected, with a design the Safety Factor of 2:1. However, as noted above, there is sufficient frangibility at selected positions and with respect to selected elements of an installed fiberglass jet blast wall structure that the structure will collapse in the area of impact of an errant jet aircraft with the blast wall. Specifically, as will be noted hereafter, the jet blast wall structure of the present invention is designed with back-to-back edge frame members for the respective panels that comprise the blast deflector, which edge frame members are secured together by nuts and bolts where the bolts have a predetermined shear strength so as to fail at shear forces above that predetermined shear strength.

This designed failure mode of the fiberglass blast wall structures in keeping with the present invention is such that significant damage to an impacting aircraft which might accidentally collide with the blast wall, is precluded.

The fiberglass jet blast wall structures of the present invention are modular in nature, comprising a plurality of panels and support members therefor. Because of the fiberglass material from which the blast wall structures are manufactured, each of the individual elements is relatively lightweight, such that it may be manhandled by construction crew workers without the necessity for the use of cranes and the like. Thus, the presence of cranes—which are necessarily very high with respect to the structure being built—is not necessary, and moreover the presence of large metallic fabrication vehicles is also precluded. Thus, there may be considerably less downtime in respect of the adjacent runway where a fiberglass jet blast wall structure is being built due to avoidance of height restrictions; and no unnecessary interference with radio or radar frequency installations in the immediate area as a consequence of the presence of large construction vehicles.

Another advantage to the utilization of fiberglass jet blast wall structures in keeping with the present invention is their low maintenance. Moreover, because of their smooth surface, snow or other debris are much less likely to collect on the surface of the blast wall. Still further, the jet blast wall structures of the present invention are significantly resistant to corrosion or damage as a consequence of fuel or de-icing chemicals being splashed on them.

The blast wall structures of the present invention are also fire retardant.

PRIOR ART

The following U.S. Patents are representative of various jet blast deflectors or blast walls as may presently be found in most airports, particularly those having jet aircraft traffic.

U.S. Pat. No. 2,826,382 shows a jet engine exhaust deflector which comprises a plurality of curved vanes that are horizontally disposed and spaced apart one from another, so that a jet blast impinging upon them is deflected upwardly.

U.S. Pat. No. 2,974,910 teaches a blast fence having a curved sheet metal face which is so curved as to be a segment of a cylinder. This curved deflecting surface is such that the major proportion of a jet blast impinging upon it is deflected upwardly.

U.S. Pat. No. 4,471,924 teaches a blast deflecting fence having a complicated structure with upper and lower deflecting surfaces, with the upper deflecting surface overlapping the upper lower deflecting surface. The deflecting surface structures are covered with corrugated metal which is secured to metal framework.

U.S. Pat. No. 5,127,609 also teaches a jet blast deflector fence which has a curved configuration that is designed so as to resist torsion, bending, or twisting. The deflector surface is, once again, corrugated galvanized metal.

U.S. Pat. No. 5,429,324 comprises two curved corrugated deflecting surfaces which are separated one from the other by a common structural framework. The effective height of the jet blast deflector fence is increased as a consequence of the structure and configuration.

U.S. Pat. No. 6,802,477 teaches a blast deflector which is particularly intended for location on a sea vessel, in other words it is intended for installation on an aircraft carrier. Here, the blast is deflected downwardly.

A further patent which teaches a housing for a radio antenna or the like, and which is intended for installation on an airport property, is U.S. Pat. No. 5,299,397. Here, the structure takes the shape of a barrel which is mounted effectively on a stilt-like support structure. The barrel is designed so that it will withstand prolonged exposure to high velocity wind conditions, but is such that it upon impact of a small airplane traveling at 75 mph it will break into small pieces so as to preclude major structural damage to the airplane.

SUMMARY OF THE INVENTION

In accordance with one aspect of the present invention, there is provided a jet blast wall structure to withstand and deflect high temperature jet blasts from the jet engines of aircraft.

The jet blast wall structure comprises a plurality of panels, each of which has a front panel face and edge frame members at each side of the front panel face to which the front panel face is secured.

Each edge frame member has a square C configuration with the base of the square C located at the edge of the panel, so that adjacent panels are secured one to the other by placing the respective bases of the respective edge frame members in back-to-back relationship and passing bolts through holes in the bases of the edge frame members and tightening nuts thereonto.

Also, each front panel face is made substantially of fiberglass, and each edge frame member, each bolt, and each nut, is made from fiberglass.

The bolts are dimensioned and constructed of fiberglass material so as to have a predetermined shear strength, whereby in the event of impact of an aircraft with the jet blast wall structure, the bolts in the edge frame members of the impacted panel or panels will fail in shear so as to permit the impacted panel or panels to collapse and thereby so as preclude significant damage to the impacting aircraft.

Each edge frame member and each bolt is made from pultruded fiberglass, and each nut is made from molded fiberglass.

The shear strength of the bolts is in the range of 450 psi to 950 psi.

The panels are installed so that the front panel faces are sloped upwardly from the ground at an angle of 65° to 85° to the horizontal; and bracing members are set against and secured to the edge frame members by additional fiberglass nuts and bolts.

The bracing members are made from pultruded fiberglass, and the additional fiberglass bolts have a predetermined shear strength which is equal to or greater than the shear strength of the bolts which secure adjacent panels one to the other.

The front panel faces of the panels are secured to the respective edge frame members by fiberglass bolts having a predetermined shear strength which is equal to or greater than the shear strength of the bolts which secure adjacent panels one to the other.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
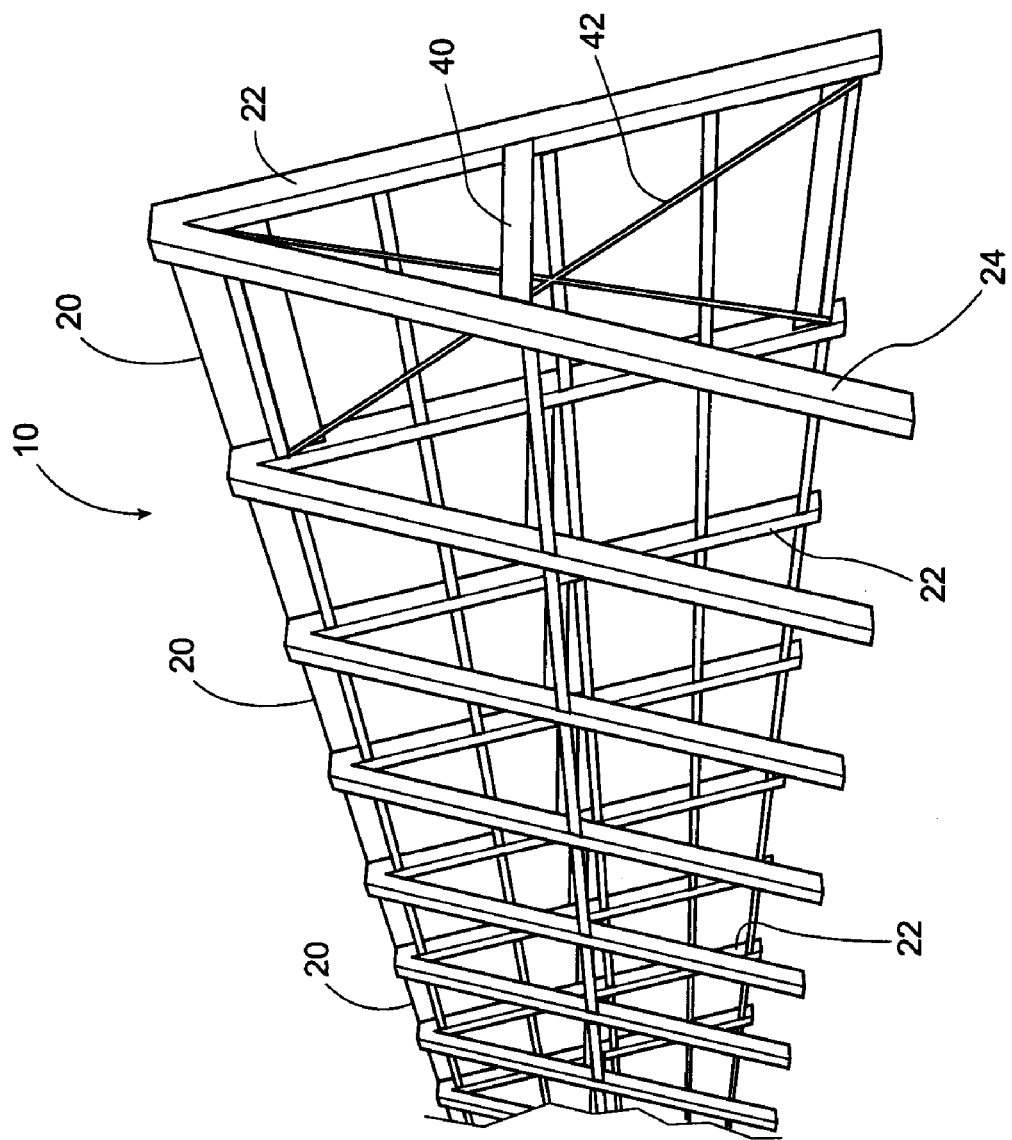
FIG. 1 shows a partial view of an installed fiberglass jet blast wall structure in keeping with the present invention.
Figure 2:
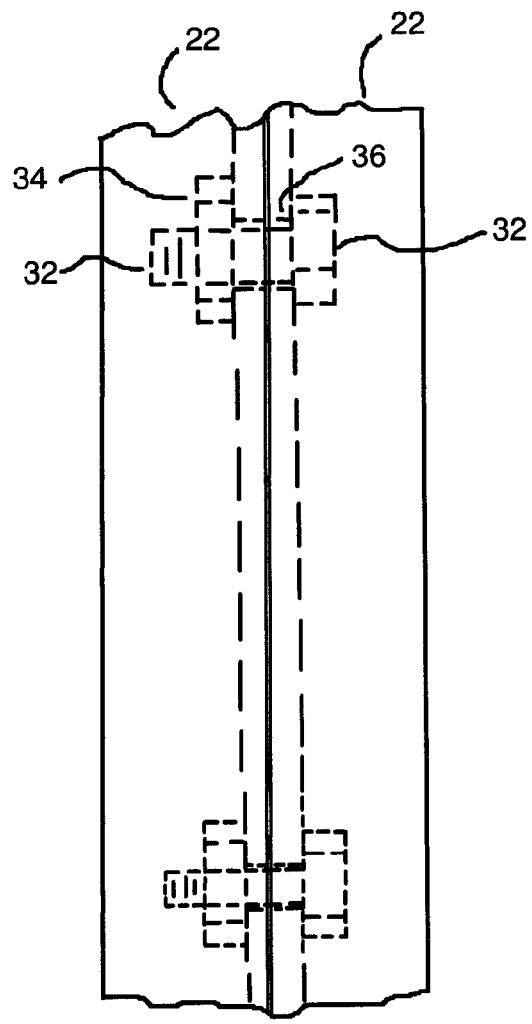
FIG. 2 shows a detail of the manner in which adjacent panels of the fiberglass jet blast wall structure are secured together.
Figure 3:
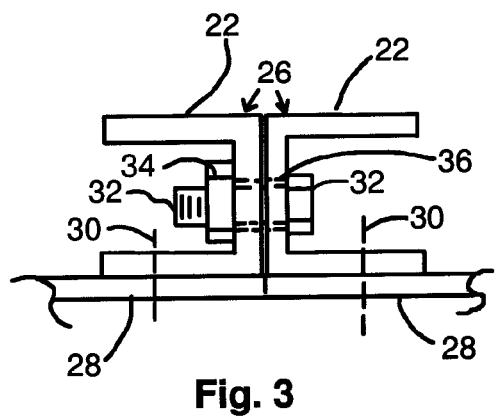
FIG. 3 shows the same detail as FIG. 2, except from an end thereof.

A portion of an installed fiberglass jet blast wall structure 10 is shown in FIG. 1. The structure comprises a plurality of panels 20 each of which has a front panel face 28 and edge frame members 22, the details of which are discussed hereafter with respect to FIGS. 2 and 3. Because the front panel faces 28 are sloped upwardly from the ground at an angle which is typically between 65° and 85°, the individual panels are supported by a framing structure which comprises bracing members 24. As seen in FIG. 3, the edge frame members 22 each have a square C configuration, with the base 26 of the square C being located at the edge of the respective panel 28. The panels 28 are secured to the edge frame members 22 by bolting such as at locations 30, the details of which are irrelevant to the present discussion.

However, it must be noted that the edge frame members 22 are positioned in back-to-back relationship one to another, whereby adjacent panels of the installed fiberglass jet blast wall structure may be secured together. The edge frame members 22 are secured one to another by passing bolts 32 through holes 36, and securing them in place using nuts 34. As noted above, all of the front panel faces 28, edge frame members 22, bolts 32, and nuts 34, are manufactured from fiberglass material, typically by pultrusion or molding techniques—the details of which are beyond the scope of the present invention.

It has also been noted that a principal feature of the present invention is the fact that in the unlikely event that the jet blast wall structure may be impacted by an errant aircraft, it is intended that portions of the jet blast wall structure will collapse so as to preclude significant damage to the impacting aircraft. This is accomplished by designing the bolts 32 in such a manner that they have a predetermined shear strength. Thus, in the event of impact by an aircraft upon the jet blast wall structure, the bolts 32 in the edge frame members 22 at the edges of the panel or panels which have been impacted will fail in shear. In turn, the impacted panel or panels will collapse, and significant damage to the nose cone or wingtip, or other part of the aircraft which may have impacted the blast wall structure, will be precluded.

The bracing members 24 are typically secured to the edge frame members 22 by additional fiberglass nuts and bolts, not shown. Braces 40 may also be in place, as well as cross bracing 42. All of the fiberglass nuts and bolts that are used to secure those elements in place may have a predetermined shear strength which is equal to or greater that the shear strength of the bolts 32. Likewise, the bolts which are used to secure the front panel faces 28 in place against the edge frame members 22, may also have a predetermined shear strength which is equal to or greater than the shear strength of the bolts 32.

A typical panel 20 may have a width in the range of 2 to 3 m., and a height in the range of 4 to 6 m. As noted, the slope of the front faces of the panels 20 may be in the range of 65° to 85° to the horizontal.

The predetermined shear strength of the bolts 32 is typically in the range of 450 psi to 950 psi.

Other physical properties of a typical fiberglass blast wall construction are as follows:

Blast Wall Physical Properties:

|  | Lengthwise | Crosswise |
| --- | --- | --- |
| Tensile Strength - ASTM D638 (min.) | 200 MPa | 48 MPa |
| Tensile Modulus - ASTM D638 (min.) | 17,000 MPa | 5,500 MPa |
| Flexural Strength - ASTM D790 (min.) | 200 MPa | 70 MPa |
| Flexural Modulus - ASTM D790 (min.) | 45 | 45 |
| Compressive Strength - ASTM D695 (min.) | 0.45% | 0.45% |
| Dielectric Strength - ASTM D149 VPM (min.) | 200 | 200 |
| Dielectric strength of 25 mm. long specimen tested parallel to laminate face short time in oil KV pre 25 mm. | 35 | — |

There has been described a fiberglass jet blast wall structure which may be easily and economically manufactured and installed at an airport without the necessity for expensive construction cranes, and thereby without the necessity for extensive shutdown of an airport runway. Fiberglass jet blast wall structures in keeping with the present invention are invisible to radio and radar frequencies because they are manufactured entirely from fiberglass material. The structures are designed so as to collapse by failure in shear of connecting bolts between edge frame members of adjacent panels of the fiberglass jet blast wall structure, with the failure occurring at a predetermined shear strength.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, use of the word "substantially" herein is intended to mean that the entirety or at least most of the feature being described comprises the details of that description.

The invention claimed is:

1. A jet blast wall structure to withstand and deflect high temperature jet blasts from the jet engines of aircraft, comprising:
    a plurality of panels, each of which has a front panel face and edge frame members at each side of said front panel face to which the front panel face is secured;
    wherein each edge frame member has a square C configuration with the base of the square C located at the edge of the panel, whereby adjacent panels are secured one to the other by placing the respective bases of the respective edge frame members in back-to-back relationship and passing bolts through holes in the bases of the edge frame members and tightening nuts thereonto; and
    wherein each front panel face is made substantially of fiberglass, and each edge frame member, each bolt, and each nut, is made from fiberglass, and wherein the jet blast wall structure exhibits transparency to radar and radio frequency signals found at airports, and wherein the bolts are dimensioned and constructed of fiberglass material so as to have a predetermined shear strength, whereby in the event of impact of an aircraft with the jet blast wall structure, the bolts in the edge frame members of the impacted panel or panels will fail in shear so as to permit the impacted panel or panels to collapse and thereby preclude significant damage to the impacting aircraft.

2. The jet blast wall structure of claim 1, wherein each edge frame member and each bolt is made from pultruded fiberglass, and each nut is made from molded fiberglass.

3. The jet blast wall structure of claim 1, wherein the shear strength of said bolts is in the range of 450 psi to 950 psi.

4. The jet blast wall structure of claim 1, wherein the panels are installed so that the front panel faces are sloped upwardly from the ground at an angle of 65° to 85° to the horizontal, and wherein bracing members are set against and secured to the edge frame members by additional fiberglass nuts and bolts; and
    wherein said bracing members are made from pultruded fiberglass, and said additional fiberglass bolts have a predetermined shear strength which is equal to or greater than the shear strength of the bolts which secure adjacent panels one to the other.

5. The jet blast wall structure of claim 1, wherein the front panel faces of said panels are secured to the respective edge frame members by fiberglass bolts having a predetermined shear strength which is equal to or greater than the shear strength of the bolts which secure adjacent panels one to the other.

\* \* \* \* \*